Figure 5:
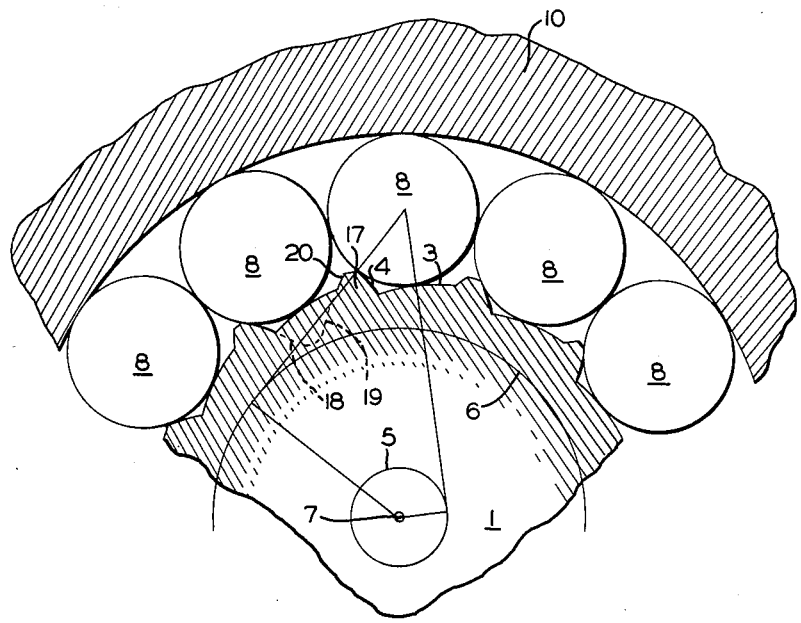

May 3, 1966 P. KLUWE 3,249,186
ONE-WAY CLUTCH WITH INVOLUTE SURFACE
Filed Jan. 18, 1960 2 Sheets-Sheet 1
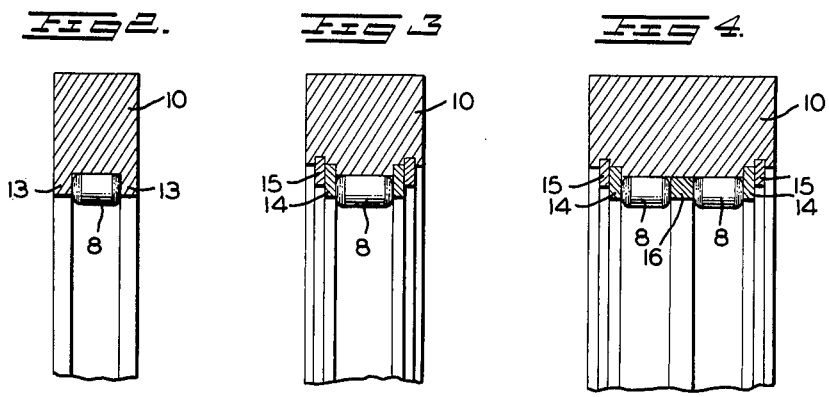
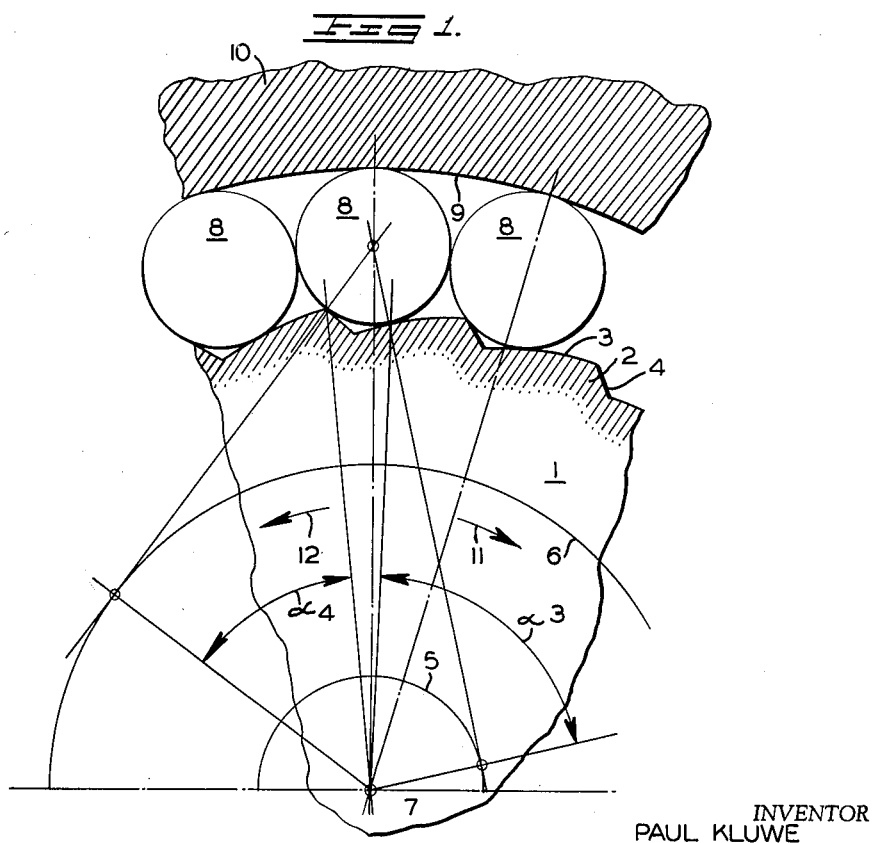
INVENTOR
PAUL KLUWE
BY *Dicke, Craig & Freudenberg*
ATTORNEYS May 3, 1966 P. KLUWE 3,249,186
ONE-WAY CLUTCH WITH INVOLUTE SURFACE
Filed Jan. 18, 1960 2 Sheets-Sheet 2

INVENTOR
PAUL KLUWE

BY Dick, Craig & Freudenberg
ATTORNEYS

United States Patent Office 3,249,186
Patented May 3, 1966

3,249,186
ONE-WAY CLUTCH WITH INVOLUTE SURFACE
Paul Kluwe, Fellbach, near Stuttgart, Germany, assignor to Daimler-Benz Aktiengesellschaft, Stuttgart-Unterturkheim, Germany
Filed Jan. 18, 1960, Ser. No. 3,189
Claims priority, application Germany, Jan. 21, 1959, D 29,813
4 Claims. (Cl. 192—45)

The present invention relates to a clamping or wedging-roller-type free-wheeling arrangement provided with cylindrical roller members which are accommodated within an outer part having a cylindrical bore and which surround a shaft provided with external teeth.

The present invention is essentially characterized by the fact that for purposes of clutching together the inner shaft and the outer part, and for purposes of initiating this clutching operation, only a single rim of individual, loose roller members are provided which are arranged closely adjacent one another without the interposition of any further part over the entire periphery of the externally toothed shaft and directly on the same.

According to a further feature of the present invention, the externally toothed shaft may be provided with teeth surfaces which represent involute surfaces of a circle.

The two circular involute surfaces, i.e. the two involute surfaces of two base circles, constituting the flank or face surfaces of the individual teeth of the externally toothed shaft, may be of different size and may have different inclination with respect to the respective radial direction thereof. The generating angle of the two involute teeth surfaces may thereby amount to approximately 40° to 60° and 80° to 85°, respectively.

The relatively large, elongated involute tooth flank or faces provided in accordance with the present invention may, furthermore, serve as a wedging surface for "locking" the one-way free-wheeling devices, whereas the relatively short, small afore-mentioned involute tooth flank or face may serve as abutment surface of the one-way free-wheeling device.

It is particularly appropriate in accordance with the present invention, for the assembly and operation of the clamping or wedging-roller-type free-wheeling device, if the diameter of the bore of the outer part is larger by a few hundredths millimeters, especially if the same is larger by 0.02 to 0.05 mm. than the outer envelope diameter of the roller rim in accordance with the present invention.

Wedging-roller-type free-wheeling devices of known construction include, in addition to the free-wheeling elements properly speaking, among others, cages, torsion springs, retainer pins, levers and the like. Consequently, the main structural parts of the free-wheeling devices of the prior art have to be provided with bores, recesses or the like for the accommodation of the auxiliary parts which weaken the main structural parts insofar as loading and possible stressing thereof is concerned, and additionally increase the cost of manufacture thereof. In case of the occurrence of vibrations in the prior art free-wheeling devices, the known torsion springs and cages may readily break and thereby lead to a total destruction of the free-wheeling device. Similar inadequacies and shortcomings, however, cannot occur in a free-wheeling device according to the present invention.

In conrast to most of the known wedging-roller-type free-wheeling devices, the free-wheeling arrangement ocording to the present arrangement is additionally capable to absorb radial bearing forces, whereas the clamping or wedging-roller-type free-wheeling devices of the prior art had to be equipped for the most part with additional ball or roller bearings for purposes of absorbing radial bearing forces.

By reason of the fact that the internal diameter of the bore in the outer part in accordance with the present invention is larger, by a few hundredths millimeters, than the outer envelope diameter of the roller rim in accordance with the present invention, it is possible by the application of a momentary overpressure to press into place also the last roller member of the roller rim in the radial direction thereof with relatively slight force. Thereafter, the roller rim is arranged readily rotatably at the outer part. Even if the iner shaft is not yet inserted into the roller rim, the roller members of the rim do not collapse in themselves. Instead, the roller members of the roller rim or ring in accordance with the present invention forms a self-supporting crown. This is of particular advantage during assembly and storage of the parts, especially with assembly-line production techniques.

For purposes of producing the clamping action for the entrainment, i.e. for the clutching action, wedging surfaces are present with the wedging-roller-type free-wheeling devices of known construction disposed either along the internal bore of the outer part or at the external surface of the inner shaft which wedging surfaces either have the shape of a straight line, of a circular arc, or of a curve not accurately defined mathematically.

In contradistinction thereto, the wedging surfaces of the wedging-roller-type free-wheeling device in accordance with the present invention, particularly the externally-toothed shaft of the wedging-roller-type free-wheeling device according to the present invention, consist of involute surfaces which are mathematically accurately defined. With the application of involute surfaces to the clamping surfaces, a very considerable simplification in the manufacture, an increased safety in operation, and a considerably longer life expectancy of the free-wheeling devices in accordance with the present invention have been obtained.

The wedging surfaces of the wedging-roller-type free-wheeling devices of the prior art were usually slotted or cut, broached, or milled and thereupon ground, whereby during manufacture of the outer wedging surfaces, one wedging surface after another had to be manufactured in separate operations.

According to the present development of manufacturing techniques, it is not possible, in separate, step-like manufacturing operations, in which the workpiece is rotated in a step-like manner by an amount corresponding to the circular pitch as contrasted to a milling or hobbing operation in which the workpiece is continuously rotated in the milling machine, to manufacture the distance of all wedging surfaces from the axial center and the division thereof itself with the accuracy necessary for a free-wheeling device. By the use of split or divided manufacturing operations, errors in the divisions as regards the distance of the wedging surfaces along the circumference thereof are unavoidable and therewith, during wedging or clamping operations, not all of the roller members are subjected to the same bearing loads, which leads to an overloading of some of the roller members and therewith to breakage of the free-wheeling parts.

For purposes of avoiding these disadvantages, the present invention, as already mentioned hereinabove, proposes the use of an involute of a circle as wedging surfaces.

The present invention also relates to a method for manufacturing the wedging-roller-type free-wheeling device in accordance with the present invention, which method is characterized by the fact that the surface of the externally toothed shaft is manufactured by hobbing operation as an involute polygon by means of a grinding tool. It is particularly advantageous in connection therewith if the hobbing cutter or grinding disk operates to machine the solid stock and that the left and right flanks or faces are produced simultaneously.

Since the tool edge in the hobbing cutter or grinding disk according to the present invention which actually performs the machining or cutting is a straight line, a very high accuracy in the work tool, such as the grinding disk, is possible. An involute polygon produced with such a hobbing cutter in the hobbing machine by hobbing operation is free from subdivision errors, and the distances of the wedging surfaces from the axle center are all equal among one another. Right and left involute flanks or faces are produced at the same time and, more particularly, as indicated above, by operating the grinding hob or cutter to machine directly the solid stock.

By reason of the manufacture of the involute polygon free of any errors caused by subdivision, it is now possible that all of the roller members of the roller rim are equally loaded in the clutching condition thereof and are free in the free-wheeling condition thereof.

By reason of the further fact that, as mentioned hereinabove, the last roller member of the roller rim is pressed into the rim under pressure, and by reason of the fact that a self-supporting roller crown or structure is formed thereby, the operating safety of the free-wheeling device is further enhanced. The roller rim does not collapse in any position thereof. Furthermore, no individual roller member may assume an oblique or inclined position or respond prematurely. All of the roller members in the free-wheeling device according to the present invention have to exercise the same functions at the same time.

As contrasted to the wedging-roller-type free-wheeling devices of the prior art, the free-wheeling device in accordance with the present invention additionally offers the advantage that, for purposes of manufacture, normally standardized, individual roller bearing parts may be used which also considerably reduces the cost of manufacture thereof.

Accordingly, it is an object of the present invention to provide a free-wheeling device of the wedging-roller-type which obviates the disadvantages both as regards manufacture and operation thereof encountered with the prior art devices of the same type.

Still another object of the present invention is the provision of a wedging-roller-type free-wheeling device which may be readily manufactured with great accuracy without entailing the danger of errors or inaccuracies due to the requirement of manufacture thereof in different operating steps and by subdivision.

A still further object of the present invention resides in the provision of a free-wheeling device utilizing clamping-type roller members in which the roller members may be readily installed into the external bearing member to form a roller crown ring which is self-supporting.

Still a further object of the present invention resides in the provision of a free-wheeling device utilizing clamping-type roller members in which only the external and internal rotating members are needed, while obviating other accessory or auxiliary parts such as races, cages, levers, arms, or the like.

Another object of the present invention resides in the provision of a roller-clamping-type free-wheeling device which absorbs all forces in a very satisfactory manner, including radial thrusts and which also assures equal loading of all the roller members at the same time and to the same extent.

Still another object of the present invention is the provision of a clamping-roller-type free-wheeling device which minimizes the danger of breakdowns due to breakages in the parts.

A further object of the present invention resides in the provision of a wedging-roller-type free-wheeling device in which the wedging surfaces are of accurately-defined, mathematically-determined configuration to thereby increase the accuracy and safety of operation of the device.

A still further object of the present invention resides in the provision of a free-wheeling device of the clamping-roller type and method of manufacturing thereof which reduces the cost of manufacture and assembly thereof, produces greater reliability in operation and entails greater life expectancy.

Still another object of the present invention resides in the method of manufacturing a wedging-roller-type free-wheeling device in which all the surfaces may be accurately manufactured and machined by simple and inexpensive means.

These and other objects, features and advantages of the present invention will become more obvious from the following description, when taken in connection with the accompanying drawing which shows, for purposes of illustration only, several embodiments in accordance with the present invention and wherein:

FIGURE 1 is a somewhat schematic, sector-shaped partial cross-sectional view of the clamping-roller-type free-wheeling device in accordance with the present invention, the cross section being taken perpendicular to the axial direction thereof, FIGURES 2 and 4 are partial cross-sectional views though four embodiments of a free-wheeling device in accordance with the present invention, and FIGURE 5 is a somewhat schematic representation, similar to FIGURE 1, of a second embodiment of a clamping-roller-type free-wheeling device in accordance with the present invention.

Referring now to the drawing, wherein like reference numerals are used throughout the various views to designate corresponding parts and, more particularly, to FIGURE 1, reference numeral 1 designates therein a part of the externally toothed shaft provided along the outer surface thereof with identical teeth, of which one representative tooth is designated by reference numeral 2. The teeth 2 themselves are provided with teeth flanks or faces 3 and 4, respectively. The tooth face 3 is thereby larger than than the tooth face 4 thereof.

The surface of the tooth face 3 is formed as an involute surface of a circle with respect to the base circle 5 thereof. The tooth face 4 represents an involute surface of a circle with respect to the base circle 6. The centers of the two base circles 5 and 6 coincide with the center 7 of the shaft 1, as shown in FIGURE 1.

The generating angle for the involute surface 3 is designated in FIGURE 1 by reference character $\alpha_3$ and the generating angle for the involute surface 4 with $\alpha_4$.

The externally toothed shaft 1 is surrounded by a rim of roller members 8 disposed closely adjacent one another which abut at the tooth faces 3 and 4 of the teeth 2. Reference numeral 9 thereby designates in FIGURE 1 the external circular envelope formed by the roller rim which coincides or corresponds almost with the inner bore of the outer ring or part 10. The inner bore in the outer ring 10 is, therefore, also designated by reference numeral 9 in FIGURE 1, even though there is a slight difference, as will appear more fully hereinafter.

For purposes of explaining the operation of the free-wheeling device in accordance with the present invention, it is assumed that the flow of torque in the illustrated free-wheeling device of FIGURE 1 takes place normally from the externally toothed shaft 1 to the outer ring part 10 and that the shaft rotates in the direction of arrow 11, i.e. in the clockwise direction. This direction of rotation 11 corresponds to the free-wheeling direction of the illustrated embodiment. The abutment surfaces 4 thereby move the individual roller members 8, which slide along the inner bore 9 of the outer ring 10. The roller members 8 are thereby capable of carrying out such sliding movements by reason of the play produced by the fact that the internal bore of the outer ring 10, as mentioned hereinabove, is larger by a few hundredths millimeters than the circle envelope 9 of the roller rim. The incline or rise of the surface 4 in the radial direction is so dimensioned that no clamping of the roller members 8 ever takes place, not even in the case when the entire free-wheeling device is subjected to radial pressure loads.

If the direction of rotation of the externally toothed shaft 1 is reversed, so as to rotate in the direction of the arrow 12, then the roller members 8 roll up a slight distance along the inclined surfaces 3 of the teeth 2 and are thereby clamped in the wedge-shaped spaces formed between the tooth surfaces 3 and the outer ring 10, and thereby establish a rigid connection between the externally toothed shaft 1 and the outer ring 10. Consequently, in the direction of rotation 12, the one-way free-wheeling device is blocked and effectively locks the parts 1 and 10.

In summary, it may be noted that the tooth faces 4 serve as abutment surfaces, and the tooth faces 3 as wedging or clamping surfaces for the roller members 8.

FIGURES 2 through 4 show three modificatons for the embodiment illustrated in FIGURE 1 of the wedging-roller-type free-wheeling device in accordance with the present invention. In the various FIGURES 2 through 4 of these different modifications of actual installations of a free-wheeling device according to the present invention, the externally toothed shaft 1 is omitted for the sake of clarity.

In the embodiment according to FIGURE 2, the outer part or ring 10 entends over or projects over the roller members 8 for purposes of at least partly laterally guiding the same within the area of the end surfaces thereof. The projecting edge portions of the outer ring 10 are thereby designated in FIGURE 2 by reference numeral 13.

In the embodiment according to FIGURE 3, abutment disks 14 are provided for purposes of retaining the roller members 8 in the axial direction thereof which are rigidly connected with the outer part 10 by means of split or snap rings 15.

The embodiment according to FIGURE 4 is based essentially on the construction of FIGURE 3. However, in the embodiment of FIGURE 4, two roller rims 8 are provided which are disposed adjacent one another in the axial direction. With the arrangement of several roller rims disposed adjacent one another in the axial direction, it is appropriate to provide a spacer ring 16 between the individual roller rims, as shown in FIGURE 4.

FIGURE 5 shows a second embodiment of a clamping-roller-type free-wheeling arrangement according to the present invention. In this embodiment, the surface 3 is also an involute surface of a circle with respect to the base circle 5. The tooth face 4 thereby represents the involute of a circle with respect to the base circle 6. The centers of both base circles 5 and 6 again coincide with the center 7 of shaft 1.

The operation of the embodiment of FIGURE 5 is essentially the same as in the embodiment of FIGURE 1. The surfaces 3 again serve as clamping wedging surfaces, whereas the surfaces 4 serve as abutment surfaces in the free-wheeling direction. The surfaces 4 are so constructed beyond the imaginary extension of the involute surfaces 3 that the teeth 17 are formed thereby. The teeth 17 are part of a normal involute tooth construction. The completely constructed teeth of this involute tooth construction, if completed as such, would represent tooth faces which are shown in dashed lines in FIGURE 5 and are designated therein by reference numerals 18 and 19. The tooth face 19 thereby projects beyond and above the wedging surface 3, and this portion which is actually present forms, in FIGURE 5, the abutment surface which is designated therein by reference numeral 20.

During free-wheeling operation, the roller members 8 abut only against the faces 4 and 3, whereas only a distance of approximately 1 mm. exists to the surface 20. In the blocking direction of rotation, the roller members 8 move along the faces 3 on the shaft 1 and thereby are clamped between the shaft 1 and the outer ring 10.

All of the faces 3, 4 and 20 may be ground simultaneously in a single chucking operation in the course of the hobbing operation by means of a grinding disk.

As is quite clear from the description herein, and especially from the embodiments illustrated in FIGURES 1 and 5, representing the wedging-roller-type free-wheeling device according to the present invention, exclusively one rim consisting of individual, loose roller members 8 disposed closely adjacent each other without the interposition of further parts serve for clutching the shaft 1 and the outer ring part 10 with each other and for initiating the clutching action, whereby the roller members are arranged over the entire periphery of the externally toothed shaft 1 and are arranged directly on the same. Consequently, the clamping-roller-type free-wheeling device according to the present invention obviates the need of the usual cages, torsion springs, securing pins, arms, levers and the like.

While I have shown and described several embodiments in accordance with the present invention, it is understood that the same is not limited thereto but is susceptible of many changes and modifications within the spirit and scope of the present invention, and I, therefore, do not wish to be limited to the details shown and described herein, but intend to cover all such changes and modifications as are encompassed by the scope of the appended claims.

I claim:

1. A clamping-roller-type free-wheeling device, comprising an outer part, an inner part, said outer part having a cylindrical bore and said inner part having teeth comprising involute surfaces of concentric base circles constituting the free-wheeling and wedging surfaces of said device, and means including only a ring consisting of individual roller members loosely disposed closely adjacent one another over the entire periphery of said inner part and directly on the same for establishing a free-wheeling condition in one direction of relative rotation of said two parts and for initiating the clamping action and clutching the same together in the opposite direction of relative rotation therebetween, the diameer of said bore being larger than the outer envelope diameter of said roller ring by an amount of approximately 0.02 to 0.05 millimeter.

2. A clamping-roller-type free-wheeling device according to claim 1, wherein said outer part extends at least partially over and in contact with the end faces of said roller members for guiding all same.

3. A clamping-roller-type free-wheeling device, comprising an outer part having a cylindrical bore, an externally toothed shaft within said bore and provided with faces formed as involute surfaces of circles, and means including only a ring consisting of individual loose roller members disposed closely adjacent one another distributed over the entire periphery of the externally toothed shaft and arranged directly on the same for establishing a free-wheeling condition in one direction of rotation of the parts and a clamping action in the opposite direction thereof, said toothed shaft being provided with a first set of said involute surfaces forming the abutment surfaces in said free-wheeling condition, a second set of said involute surfaces forming the wedging surfaces and a third set of surfaces delimiting respective ones of said second set of surfaces, respective ones of said first and third set of surfaces projecting above the imaginary extensions of said second set of surfaces and forming respective involute teeth.

4. A clamping-roller-type free-wheeling device according to claim 3, wherein the flanks of the teeth formed by respective ones of said first and third set of surfaces are formed as normal involute teeth surfaces.

(References on following page)

References Cited by the Examiner

UNITED STATES PATENTS

| | | | |
|---|---|---|---|
| 1,824,431 | 9/1931 | Halden | 192—27 |
| 1,855,690 | 4/1932 | Robbins | 192—45 |
| 2,065,244 | 12/1936 | Richards | 192—45 |
| 2,082,842 | 6/1937 | Marland | 192—45 |
| 2,100,705 | 11/1937 | Wildhaber et al. | 51—287 |
| 2,401,446 | 6/1946 | Wildhaber | 51—287 |
| 2,561,745 | 7/1951 | Lerch | 192—45 |
| 2,827,991 | 3/1958 | Bradway | 192—45 |
| 2,835,363 | 5/1958 | Long | 192—45 |
| 2,865,479 | 12/1958 | Hungerford | 192—45 |
| 3,012,645 | 12/1961 | Gensheimer et al. | 192—45 |

FOREIGN PATENTS

| | | |
|---|---|---|
| 744,998 | 2/1956 | Great Britain. |
| 753,388 | 7/1956 | Great Britain. |

OTHER REFERENCES

Marks' Mechanical Engineers Handbook, Sixth edition, 1958, McGraw-Hill Book Co., Inc., New York, sec. 8–45, 46.

DAVID J. WILLIAMOWSKY, *Primary Examiner*.

THOMAS J. HICKEY, *Examiner*.

S. G. LAYTON, *Assistant Examiner*.